US010200607B2

(12) United States Patent
Morofuji

(10) Patent No.: US 10,200,607 B2
(45) Date of Patent: Feb. 5, 2019

(54) IMAGE CAPTURING APPARATUS, METHOD OF CONTROLLING THE SAME, MONITORING CAMERA SYSTEM, AND STORAGE MEDIUM

(71) Applicant: CANON KABUSHIKI KAISHA, Tokyo (JP)

(72) Inventor: Tsuyoshi Morofuji, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 113 days.

(21) Appl. No.: 14/931,965

(22) Filed: Nov. 4, 2015

(65) Prior Publication Data
US 2016/0134810 A1 May 12, 2016

(30) Foreign Application Priority Data
Nov. 7, 2014 (JP) ................... 2014-227491

(51) Int. Cl.
H04N 5/232 (2006.01)
H04N 7/18 (2006.01)
(Continued)

(52) U.S. Cl.
CPC ........... *H04N 5/23238* (2013.01); *G06K 9/00* (2013.01); *G06T 7/254* (2017.01); *H04N 5/2254* (2013.01);
(Continued)

(58) Field of Classification Search
CPC ........ G06K 9/00; H04N 7/18; H04N 5/23238; H04N 7/183; H04N 5/2254;
(Continued)

(56) References Cited

U.S. PATENT DOCUMENTS 7,006,950 B1\* 2/2006 Greiffenhagen ............................ G08B 13/19604
382/107
2007/0003141 A1\* 1/2007 Rittscher ............ G06K 9/00778
382/181

(Continued)

FOREIGN PATENT DOCUMENTS

CN 103179342 A 6/2013
CN 103456116 A 12/2013

(Continued)

OTHER PUBLICATIONS

Extended European Search Report issued in corresponding EP Application No. 15002965.0, dated Apr. 1, 2016. (13 pages).

(Continued)

*Primary Examiner* — Zhihan Zhou
(74) *Attorney, Agent, or Firm* — Carter, Deluca, Farrell & Schmidt, LLP

(57) ABSTRACT

An image capturing apparatus comprises an object detection unit configured to detect a region of an object from a captured image captured by an image capturing unit via an omnidirectional imaging lens; a setting unit configured to set a position in the captured image corresponding to a direction perpendicular to a horizontal plane; a decision unit configured to decide, based on a relationship between the set position and a position of the object region in the captured image, a determination position used to determine passage of the object out of the region of the object; and a passage detection unit configured to detect, based on the determination position decided by the decision unit and a detection line set on the captured image, passage of the object across the detection line.

8 Claims, 11 Drawing Sheets

(51) Int. Cl.
  *G06K 9/00* (2006.01)
  *H04N 5/225* (2006.01)
  *G06T 7/254* (2017.01)
(52) U.S. Cl.
  CPC ..... *H04N 5/23206* (2013.01); *H04N 5/23293* (2013.01); *H04N 7/18* (2013.01); *H04N 7/183* (2013.01); *G06T 2207/30232* (2013.01)
(58) Field of Classification Search
  CPC ............ H04N 5/23206; H04N 5/23293; G06T 7/254; G06T 2207/30232
  See application file for complete search history.

(56) References Cited

U.S. PATENT DOCUMENTS

| | | | |
|---|---|---|---|
| 2012/0154643 A1* | 6/2012 | Okuyama | H04N 5/23238 348/241 |
| 2013/0321636 A1* | 12/2013 | Matsudo | H04N 7/18 348/152 |
| 2014/0003657 A1* | 1/2014 | Funagi | G06K 9/3241 382/103 |

FOREIGN PATENT DOCUMENTS

| | | |
|---|---|---|
| JP | H06223157 A | 8/1994 |
| JP | H08123935 A | 5/1996 |
| JP | 2002239207 A | 8/2002 |
| JP | 2008250430 A | 10/2008 |
| JP | 2011-086045 A | 4/2011 |
| JP | 2014011584 A | 1/2014 |

OTHER PUBLICATIONS

Chinese Office Action dated Jan. 19, 2018 corresponding to Chinese Application No. 201510751841.0, 17 pgs.
Japanese Office Action corresponding to Appln. No. JP 2014-227491 dated Aug. 24, 2018 (4 pages).

* cited by examiner

IMAGE CAPTURING APPARATUS, METHOD OF CONTROLLING THE SAME, MONITORING CAMERA SYSTEM, AND STORAGE MEDIUM

BACKGROUND OF THE INVENTION

Field of the Invention

The present invention relates to an image capturing apparatus, a method of controlling the same, a monitoring camera system, and a storage medium and, more particularly, to a monitoring technique of detecting an object or obtaining detailed information by monitoring.

Description of the Related Art

Conventionally, monitoring cameras are arranged at various points of a store or parking area or on a fence surrounding a specific building to monitor a theft or illegal act in the store or parking area or monitor an intrusion of a third party from outside.

In the monitoring camera system, needs have grown for a system that automatically measures and analyzes human activities to more efficiently conduct disaster prevention, monitoring, and management and administration in a public or leisure facility. For example, a partial operation amount in a facility or a facility use state is grasped from information representing how many visitors are currently going in and out of the facility and how fast they are moving in which direction. It is also possible to predict a congestion state around an observation area and obtain information to guide a crowd in a direction to avoid the congestion.

Japanese Patent Laid-Open No. 08-123935 describes a method of stably counting persons or the like on a direction basis even in a situation where, for example, walkers who gather and separate at an entrance are moving in indefinite directions. Also described is using, as a count line, a curve according to the distortion of a lens, which is a curve on the screen but changes to a straight line when projected onto the floor surface in the captured real space, in a case where distortion occurs in the peripheral portion of a video because of use of a wide angle lens or the like.

Japanese Patent Laid-Open No. 06-223157 describes setting a virtual gate on an observed image by image processing, and detecting a moving object without impeding its natural flow when the traffic line or projected figure of the moving object moves across the virtual gate.

However, in these conventional techniques, when an object passes near a passage detection line, it may cross the passage detection line depending on its size (height), resulting in a detection error.

An omnidirectional camera using a fish-eye lens can shoot a relatively wide range, and is therefore effective to monitor a wide space looked down from above. However, when capturing a relatively narrow space in, for example, a small store by the omnidirectional camera, the size of an object cannot be neglected. When an object passes near the passage detection line, it may partially cross the passage detection line, and a detection error may occur.

The present invention has been made in consideration of the above-described problems, and provides a technique of reducing detection errors and implementing stable passage detection even in a case where an object passes near a passage detection line.

SUMMARY OF THE INVENTION

According to one aspect of the present invention, there is provided an image capturing apparatus comprising: an object detection unit configured to detect a region of an object from a captured image captured by an image capturing unit via an omnidirectional imaging lens; a setting unit configured to set a position in the captured image corresponding to a direction perpendicular to a horizontal plane; a decision unit configured to decide, based on a relationship between the set position and a position of the object region in the captured image, a determination position used to determine passage of the object out of the region of the object; and a passage detection unit configured to detect, based on the determination position decided by the decision unit and a detection line set on the captured image, passage of the object across the detection line.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In this embodiment, a position of an omnidirectional camera in the vertical direction (a direction perpendicular to a horizontal plane on a real space) is set on an omnidirectional image as a vertical reference position. An example will be described in which a determination position used to determine detection of object passage across a line is set on an object region based on the positional relationship between the vertical reference position and an object position, and passage detection is done based on passage of the determination position across the detection line.

Figure 1:
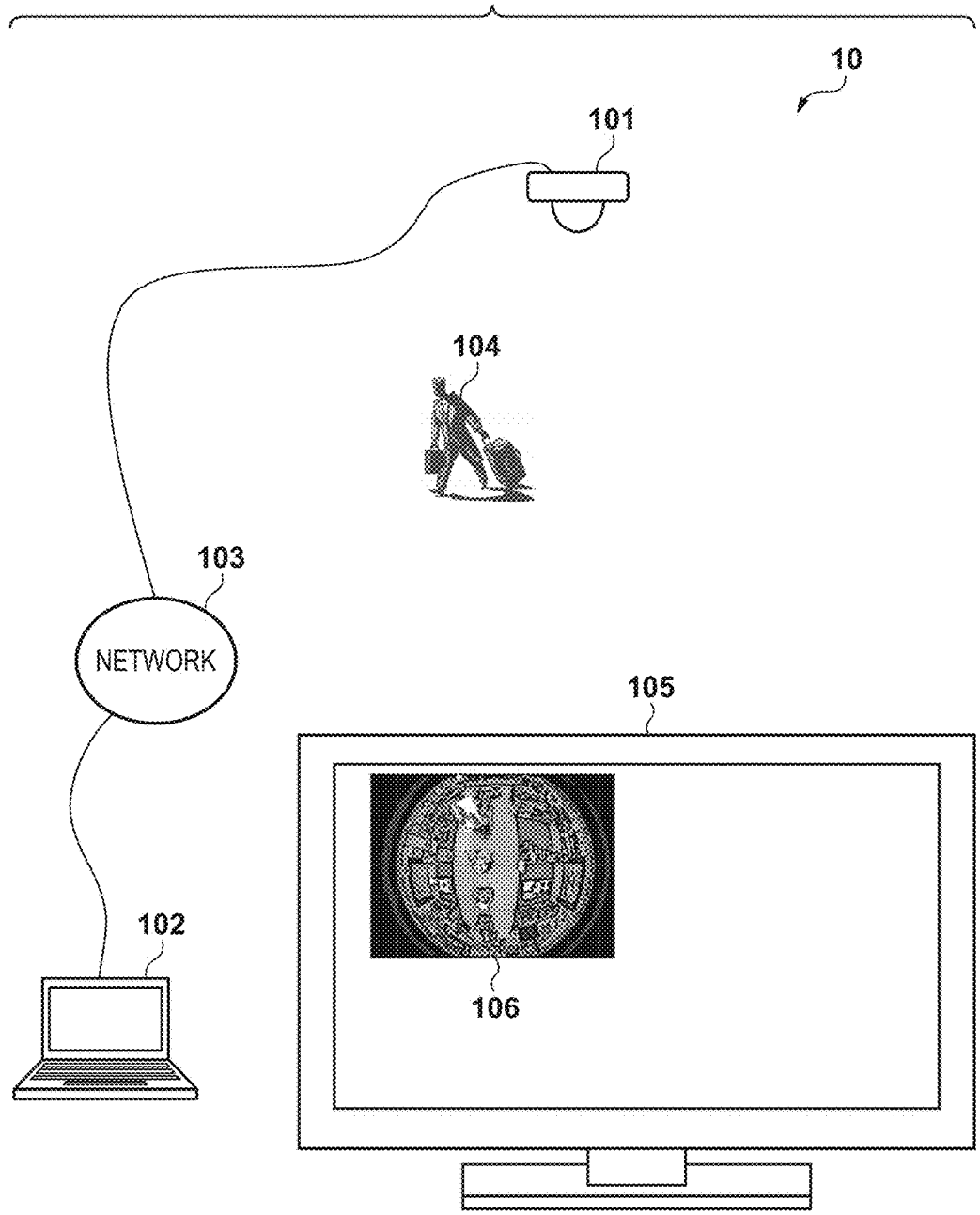
FIG. 1 is a view showing an example of the arrangement of a monitoring camera system according to an embodiment of the present invention.

An example of the arrangement of a monitoring camera system according to an embodiment of the present invention will be described first with reference to FIG. 1. A monitoring camera 10 includes an image capturing apparatus 101 and a client terminal 102. The image capturing apparatus 101 and the client terminal 102 are connected via a network 103.

The image capturing apparatus 101 is, for example, an omnidirectional camera including a fish-eye lens and is attached to a ceiling while vertically facing downward. A video of an object 104 captured by the image capturing apparatus 101 is transmitted to the client terminal 102 or a recording server (not shown) via the network 103. A display apparatus 105 is a display apparatus included in the client terminal 102 or a display apparatus connected to the recording server (not shown), and displays an omnidirectional image 106 captured by the image capturing apparatus 101.

Figure 2:
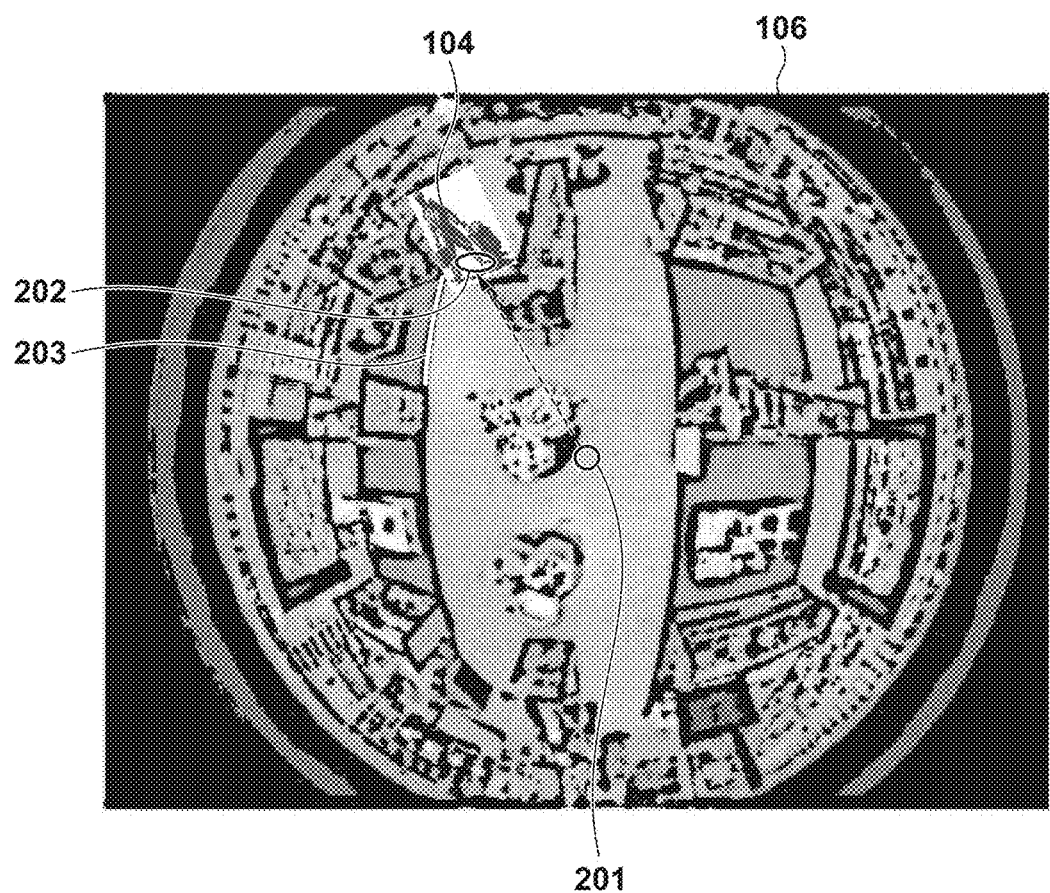
FIG. 2 is a view showing an example of an omnidirectional image according to the first embodiment.

FIG. 2 shows an example of the omnidirectional image 106 obtained by capturing the interior of a store by the image capturing apparatus 101 attached to the ceiling while vertically facing downward. According to an instruction of an operator (not shown), a detection line 203 is set in advance to, for example, detect the number of passages of persons or warn about passage of a person. If the object 104 walks along an aisle, it may cross the detection line 203, and the image capturing apparatus 101 may erroneously determine that a person has passed.

A vertical reference position 201 indicates a vertical direction to the ground. In particular, it is a vertical reference position when an image is captured by the image capturing apparatus 101 attached to the ceiling while vertically facing downward. Because of the characteristics of the fish-eye lens provided in the image capturing apparatus 101, the vertical reference position 201 is set at the center of the captured image. Note that the user may designate the vertical reference position on a display screen. The captured image is formed radially with respect to the vertical reference position as the center. A portion of the object 104 located at the shortest distance with respect to the vertical reference position 201 that is the vertical position of the image capturing apparatus 101 is defined as the position of a foot portion 202 of the object 104. That is, the position of the foot portion 202 is decided as the determination position used to determine object passage across the line. Crossing (passage) of the foot portion 202 across the set detection line 203 is detected. Since the foot portion 202 and the detection line 203 exist on the same plane (ground), it is possible to reduce detection errors and perform stable passage detection.

Figure 3:
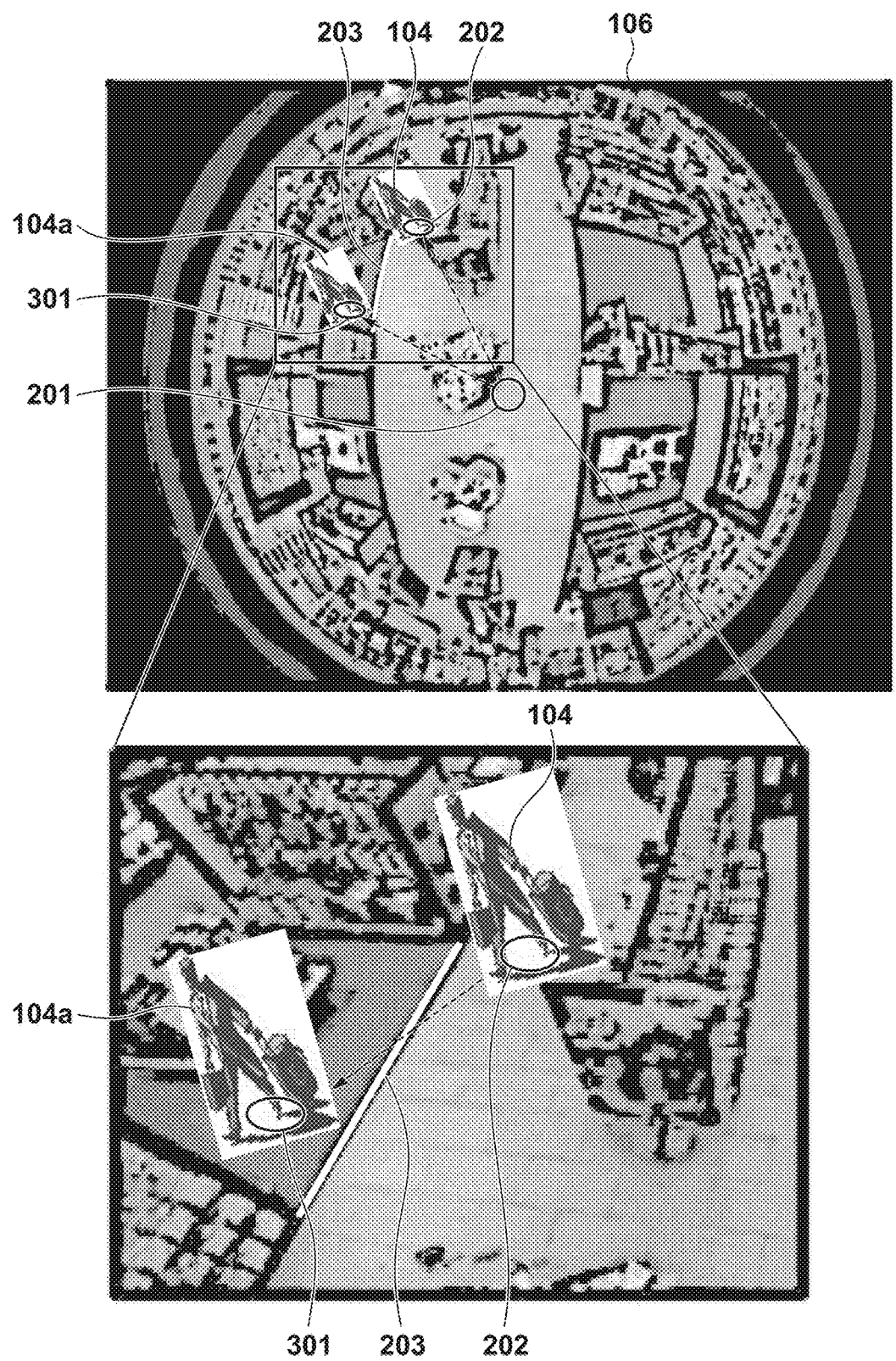
FIG. 3 is a view showing an example of an omnidirectional image according to the first embodiment.

For example, when the object 104 moves to the position of an object 104a, as shown in FIG. 3, it is detected that the foot portion 202 of the object 104 passes across the detection line 203 and moves to a foot portion 301 of the object 104a. Hence, object passage is appropriately determined.

Figure 4:
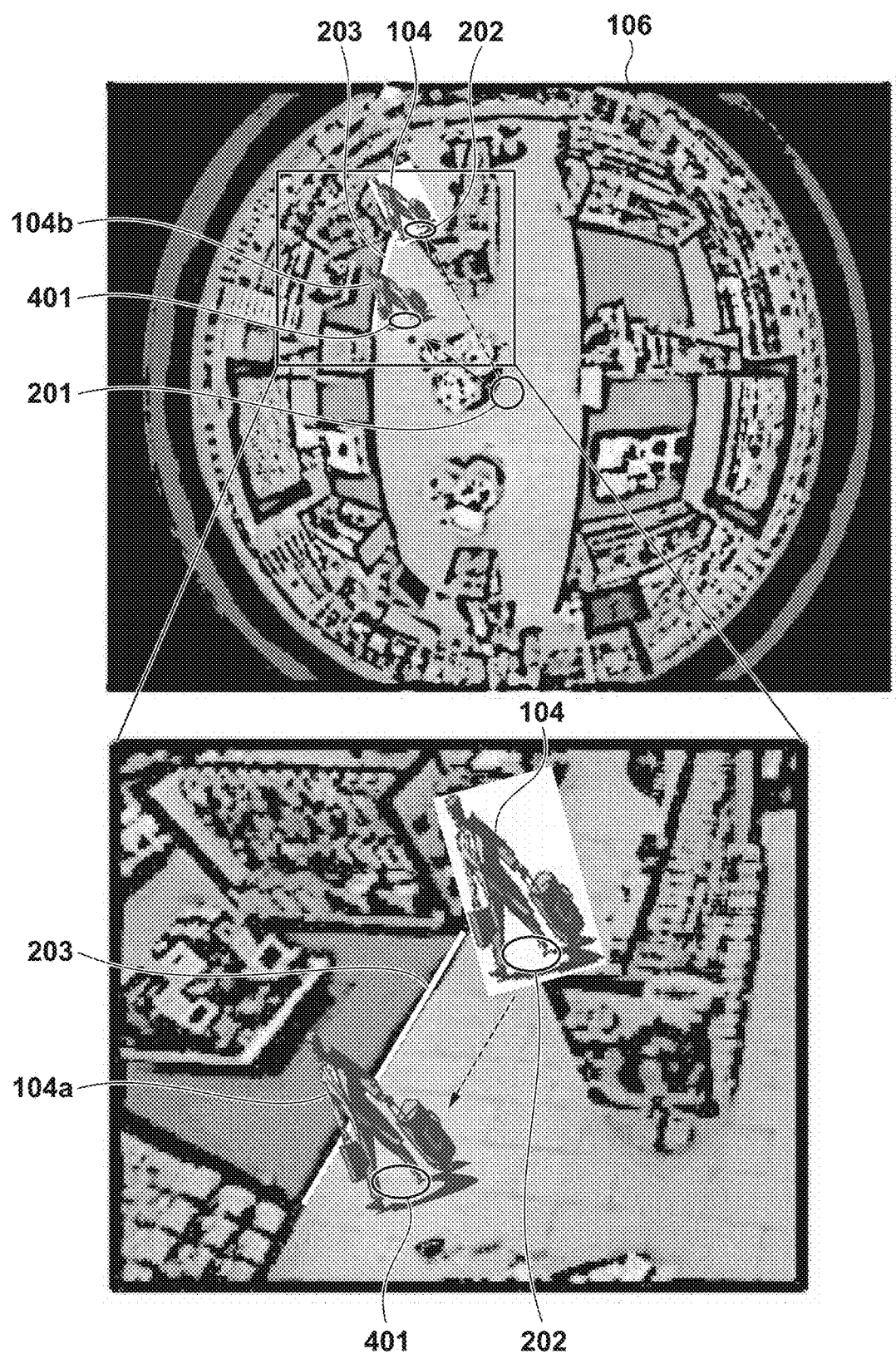
FIG. 4 is a view showing an example of an omnidirectional image according to the first embodiment.

On the other hand, FIG. 4 shows a case where the object 104 moves to the position of an object 104b along the aisle (in parallel to the detection line 203). In this case, the foot portion 202 of the object 104 never crosses the detection line 203 during movement to a foot portion 401 of the object 104b. Hence, a detection error can be prevented.

Figure 5:
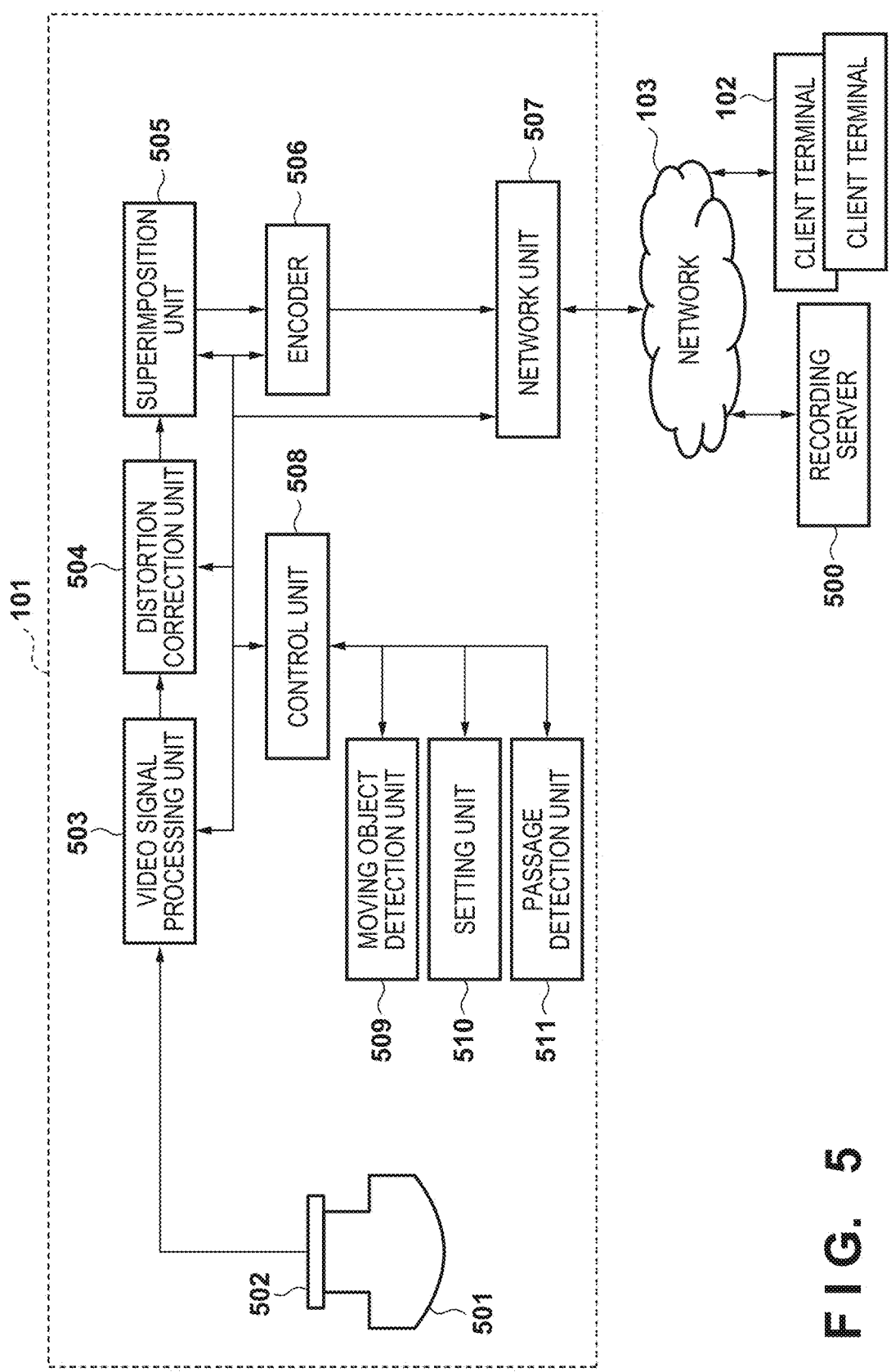
FIG. 5 is a block diagram showing an example of the arrangement of an image capturing apparatus according to the first embodiment.

An example of the arrangement of the image capturing apparatus 101 according to the first embodiment will be described next with reference to FIG. 5. The image capturing apparatus 101 includes a fish-eye lens (omnidirectional imaging lens) 501, an image sensor 502, a video signal processing unit 503, a distortion correction unit 504, a superimposition unit 505, an encoder 506, a network unit 507, a control unit 508, a moving object detection unit 509 a setting unit 510, and a passage detection unit 511. The operation of each constituent element is controlled when the control unit 508 reads out a computer program from a memory (not shown) and executes it.

The video of the object 104 is projected onto the image sensor 502 via the fish-eye lens 501. The projected image is converted into an electric signal and sent to the video signal processing unit 503. The video signal processing unit 503 performs processing such as color separation, white balance, and gamma correction, and outputs the processing result to the distortion correction unit 504. In response to a request of the client terminal 102, the distortion correction unit 504 performs correction and processing of a distorted image corresponding to the state of the omnidirectional image or various display modes such as 360° panorama, 180° double panorama, 4 frame extraction, and 8 frame extraction. In this embodiment, appropriate passage detection can be performed before correction processing of the distorted image.

The superimposition unit 505 prepares an image layer of the detection line 203 that has undergone distortion in advance and superimposes the detection line 203 on the omnidirectional image 106. For an expanded image (360° panorama, 180° double panorama, 4 frame extraction, or 8 frame extraction), the superimposition unit 505 superimposes a time, date/time, camera name, azimuth, and the like, and outputs the image.

Note that when information such as a time, date/time, camera name, or azimuth is superimposed on the omnidirectional image 106, the characters and the image deform at the time of expansion (distorted image correction). It is therefore effective to superimpose the information on a black image portion and directly remove it at the time of expansion (image distortion correction) in the client. Alternatively, the information may be embedded in the black image portion as data and extracted at the time of expansion in the client.

Next, the encoder 506 performs encode processing and outputs the data to the network unit 507. The network unit 507 distributes the data to a recording server 500 or the client terminal 102 via the network 103.

A control command transmitted from the recording server 500 or the client terminal 102 is received by the network unit 507 via the network 103 and sent to and interpreted by the control unit 508. For example, when a change command to instruct change to 180° double panorama is transmitted from the client terminal 102, the control unit 508 interprets the command, and the distortion correction unit 504 performs the change to the 180° double panorama.

The moving object detection unit 509 detects a moving object (object 104) from the captured image (omnidirectional image 106) captured via the fish-eye lens (omnidirectional imaging lens) 501. The setting unit 510 sets the vertical reference position 201 corresponding to the vertical position of the fish-eye lens (omnidirectional imaging lens) 501 on the captured image (omnidirectional image 106). The setting unit 510 also sets the position of the foot portion 202 of the moving object (object 104) based on the vertical reference position 201 and the position of the moving object (object).

The passage detection unit 511 detects passage of the moving object (object 104) across the detection line 203 based on the position of the foot portion 202 and the detection line 203 set on the captured image (omnidirectional image 106).

Figure 6:
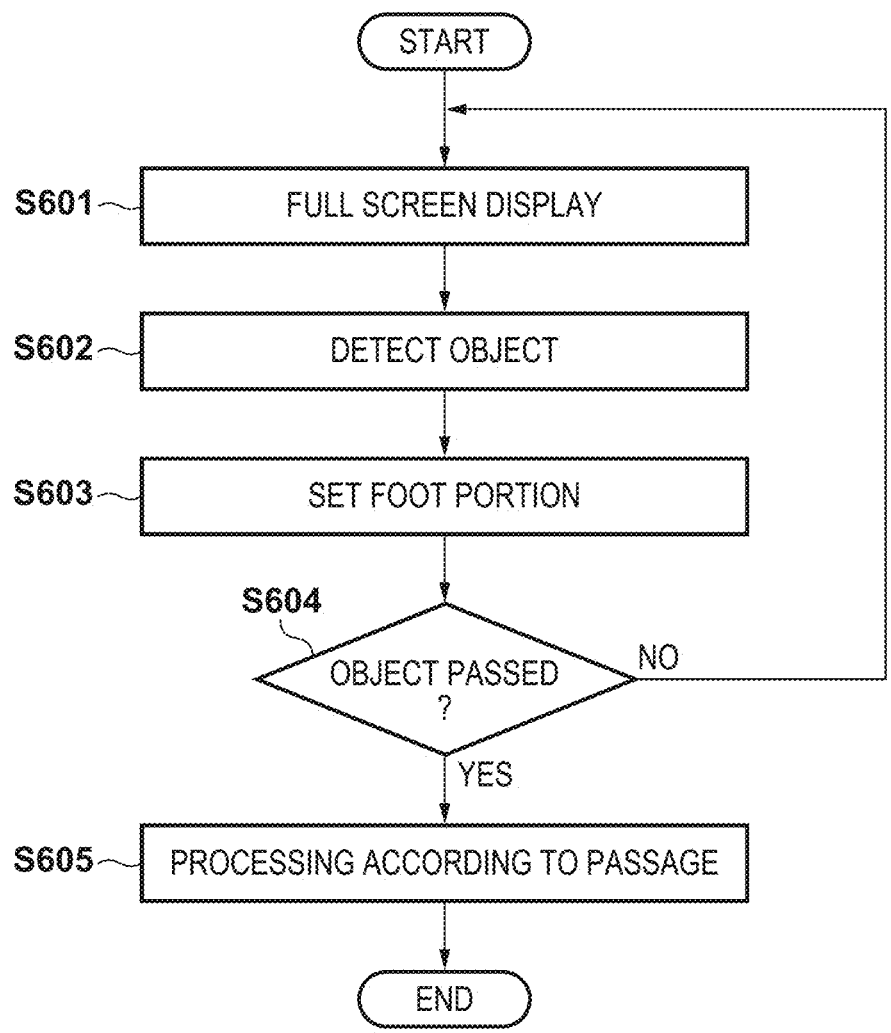
FIG. 6 is a flowchart showing the procedure of processing executed by the image capturing apparatus according to the first embodiment.

The procedure of processing executed by the image capturing apparatus 101 according to the first embodiment will be described next with reference to the flowchart of FIG. 6.

In step S601, the control unit 508 transmits the omnidirectional image 106 projected on the image sensor 502 via the fish-eye lens 501 to the display apparatus 105 to perform full screen display. In step S602, the control unit 508 controls the moving object detection unit 509 to detect the moving object (object 104) in the omnidirectional image 106. Note that in step S602, processing of detecting the moving object from the omnidirectional image 106 by, for example, background subtraction is executed. This is because the affinity is higher than template matching since the omnidirectional image has distortion. In step S603, the control unit 508 controls the setting unit 510 to set the position of the foot portion of the detected moving object (object 104).

As described with reference to FIGS. 2 to 4, the setting unit 510 sets the vertical position of the image capturing apparatus 101 (for example, the central position of the omnidirectional image 106) as the vertical reference position 201, and decides the position of the object 104 nearest to the vertical reference position 201 as the position of the foot portion 202 of the object 104.

In step S604, the control unit 508 controls the passage detection unit 511 to determine, based on the preset detection line 203 and the foot portion 202 of the object 104, whether the object 104 has passed across the detection line 203. If the object 104 has passed across the detection line 203, the process advances to step S605. On the other hand, if the object 104 has not passed across the detection line 203, the process returns to step S601.

In step S605, the control unit 508 executes processing according to detection of passage of the object 104 across the detection line 203. For example, to warn about passage of the object in the monitoring camera system, the control unit 508 may transmit the passage detection result to the client terminal 102 via the network unit 507 to display a warning on the display apparatus 105 or make a notification by a sound on the side of the client terminal 102. If the client terminal 102 calculates the total number of passed persons, the control unit 508 may transmit information about the total number of passed persons to the client terminal 102 via the network unit 507. The client terminal 102 may count the number of passed persons or display the counted number of persons on the display apparatus 105. Various other processes according to the purpose can be executed. Each process shown in FIG. 6 thus ends.

Note that some or all of the series of processes such as passage detection processing may be performed on the client terminal 102. This embodiment is also applicable to an omnidirectional image whose shape is adjusted according to the characteristics of a different fish-eye lens (for example, omnidirectional lens that increases the image capturing area on the image sensor 502 and improves the peripheral resolution). In this case, for example, the present invention is similarly applicable to an omnidirectional image that has not the normal circular shape but an elliptical shape.

As described above, in this embodiment, the vertical position of the omnidirectional camera is defined as the reference position, a foot portion is set based on the positional relationship between the reference position and the object position, and passage detection is done based on passage of the foot portion across the detection line. It is therefore possible to reduce detection errors and implement stable passage detection even in a case where an object passes near the passage detection line.

In another embodiment, an example will be described in which the height of the centroid position of an object with respect to the foot portion of the object is detected, a second detection line is set by reflecting the detected height on a detection line on the ground, and crossing (passage) of the centroid position across the second detection line is detected, thereby performing passage detection.

Figure 7:
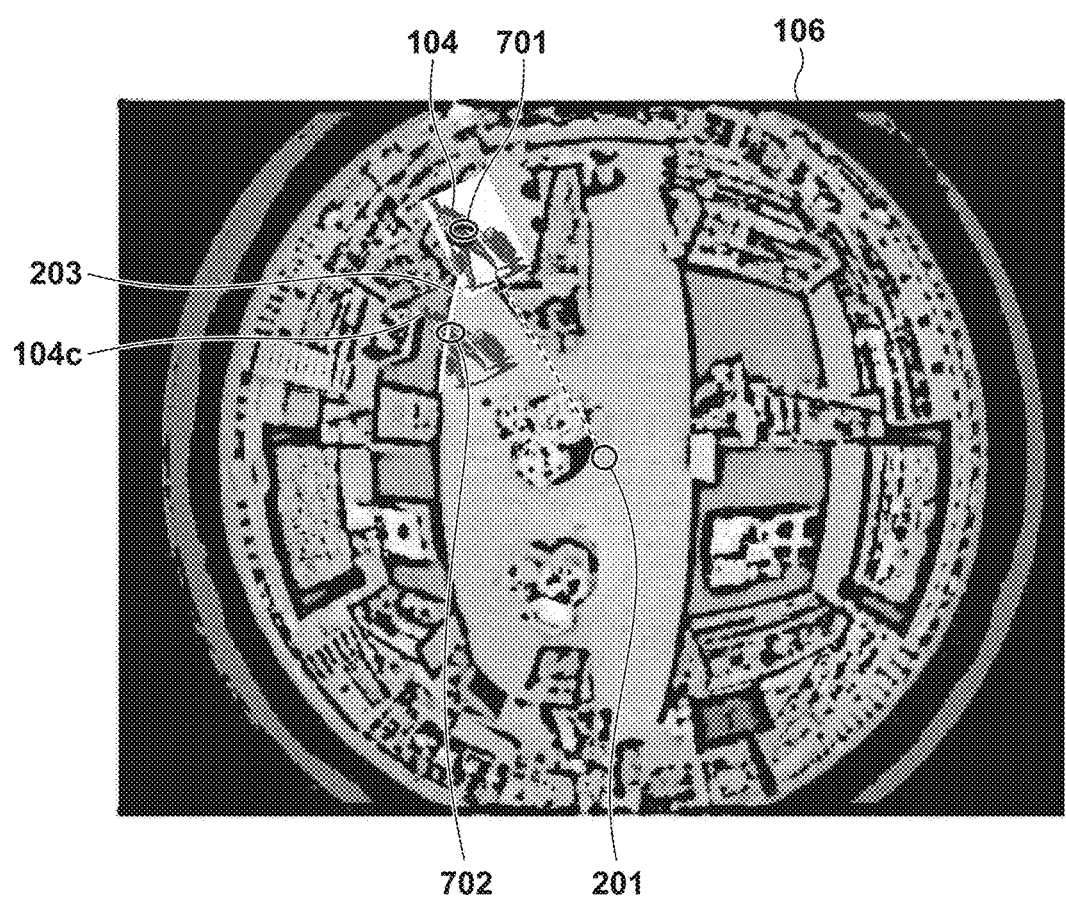
FIG. 7 is a view showing an example of an omnidirectional image according to the second embodiment.

FIG. 7 shows an example of an omnidirectional image 106 obtained by capturing the interior of a store by an image capturing apparatus 101 attached to the ceiling while vertically facing downward. An operator sets a detection line 203 in advance to, for example, detect the number of passages of persons or warn about passage of a person.

As in the first embodiment, the vertical position of the image capturing apparatus 101 (the central position of the omnidirectional image 106) is set as a vertical reference position 201, and a portion of an object 104 nearest to the vertical reference position 201 is set as a foot portion 802 of the object 104. Assume that passage of a centroid position 701 of the object 104 across the detection line 203 is detected. In this case, if the object 104 moves to the position of an object 104c, the centroid position 701 moves to a centroid position 702 and crosses the detection line 203. Hence, it is erroneously determined that the object 104 has passed.

Figure 8:
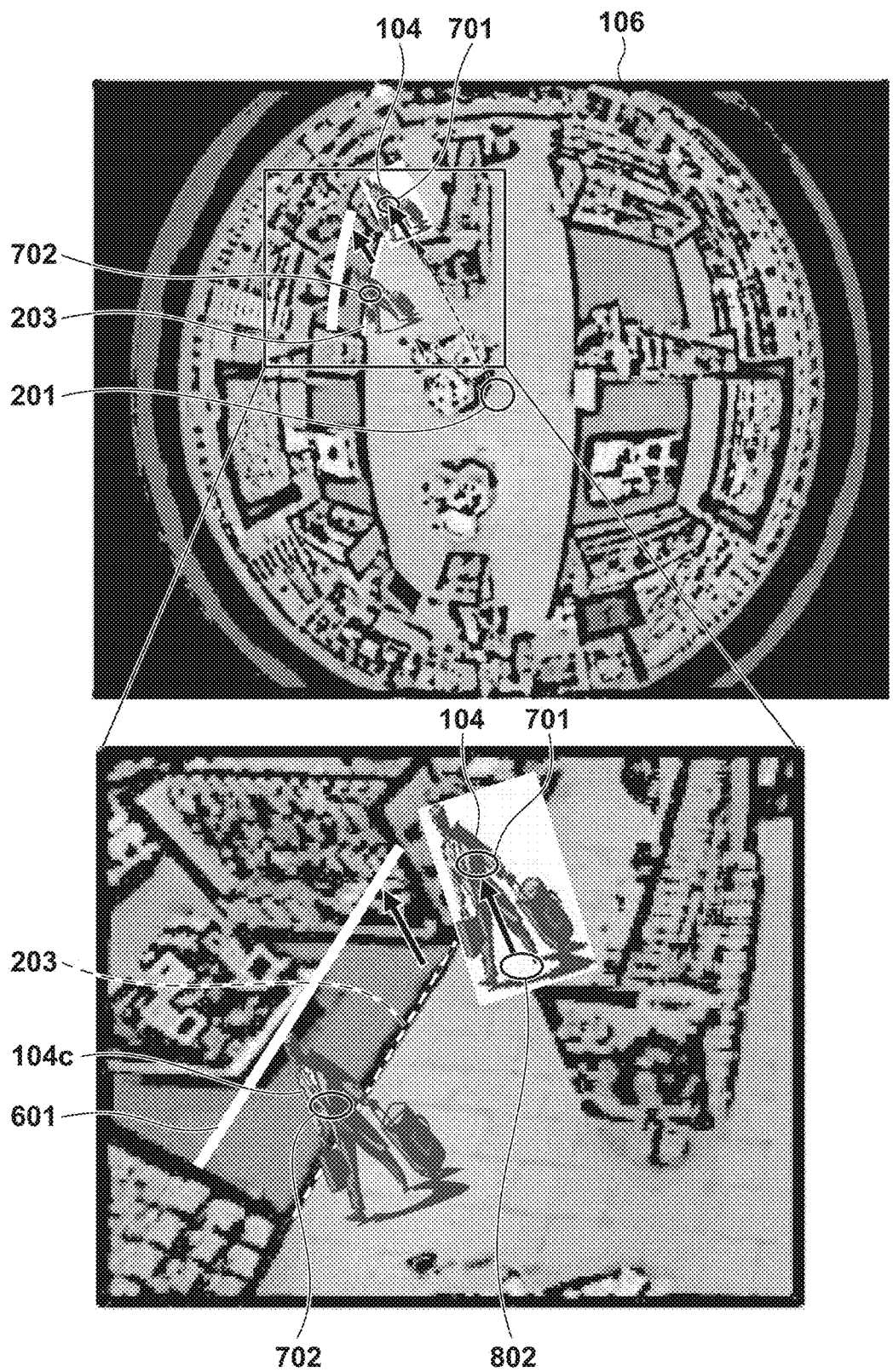
FIG. 8 is a view showing an example of an omnidirectional image according to the second embodiment.

To prevent this, as shown in FIG. 8, the height of the centroid position 701 with respect to the foot portion 802 of the object 104 is set. The detection line 203 on the ground is moved to a position apart from the vertical reference position by a distance corresponding to the set height, and the setting of a detection line 801 is updated. Crossing (passage) of the centroid position 701 of the object 104 across the detection line 801 is detected, thereby performing passage detection.

The centroid position 701 of the object 104 is set, for example, at a position apart from the position of the foot portion 802 by a predetermined distance on a line that connects the vertical reference position 201 and the position of the foot portion 802. The predetermined distance between the position of the foot portion 802 and the centroid position 701 may be set in accordance with the distance from the vertical reference position 201 to the position of the foot portion 802. For example, if the object 104 is located near the vertical reference position 201 or near the circular edge of the omnidirectional image 106, the predetermined distance is set short. This is because if the object 104 exists near the vertical reference position 201, the object 104 is observed from above, and the length (apparent height) of the object 104 is short. Alternatively, the centroid position (for example, a position near the waist) may be estimated by analyzing the detected object 104, and the estimated position may be set as the centroid position 701. Otherwise, the middle point between a portion of the object nearest to the vertical reference position 201 and a portion of the object farthest from the vertical reference position 201 may be set as the centroid position 701 of the object 104.

Since the detection line 801 and the centroid position 701 (centroid position 702) are set on the same plane (same height), it is possible to reduce detection errors and perform stable passage detection.

Figure 10:
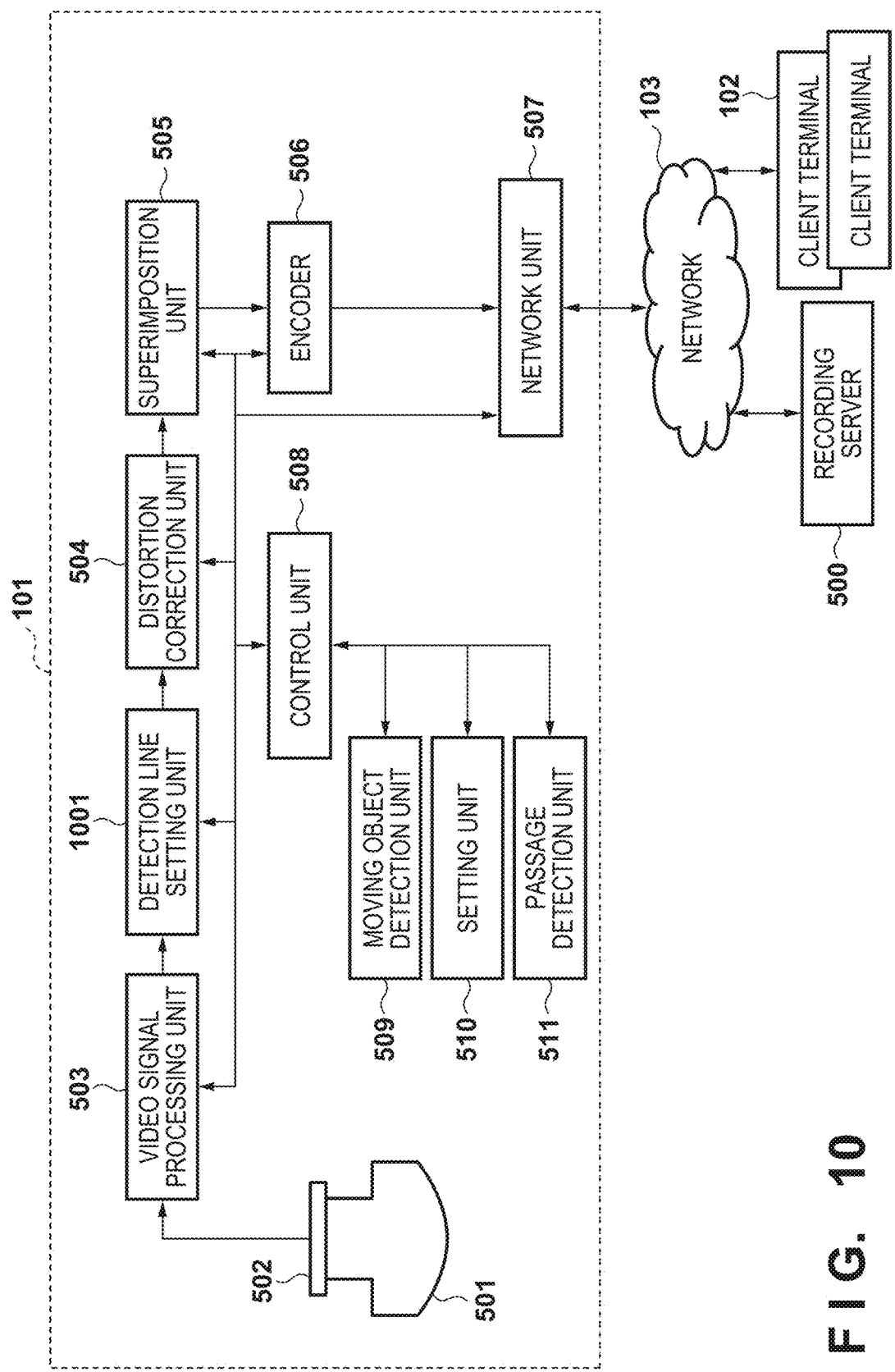
FIG. 10 is a block diagram showing an example of the arrangement of the image capturing apparatus according to the second embodiment.

An example of the arrangement of the image capturing apparatus 101 according to this embodiment will be described next with reference to FIG. 10. The arrangement shown in FIG. 10 further includes a detection line setting unit 1001, in addition to the constituent elements described with reference to FIG. 5. The detection line setting unit 1001 superimposes a detection line that has undergone processing according to distortion of the lens.

For an expanded image (360° panorama, 180° double panorama, 4 frame extraction, or 8 frame extraction), a superimposition unit 505 can superimpose a time, date/time, camera name, azimuth, and the like, and output the image. In addition, to allow the monitor (operator) to identify the direction, the preset position, direction, or the like of "entrance" or "hall" may be displayed at an end of the screen.

Figure 9:
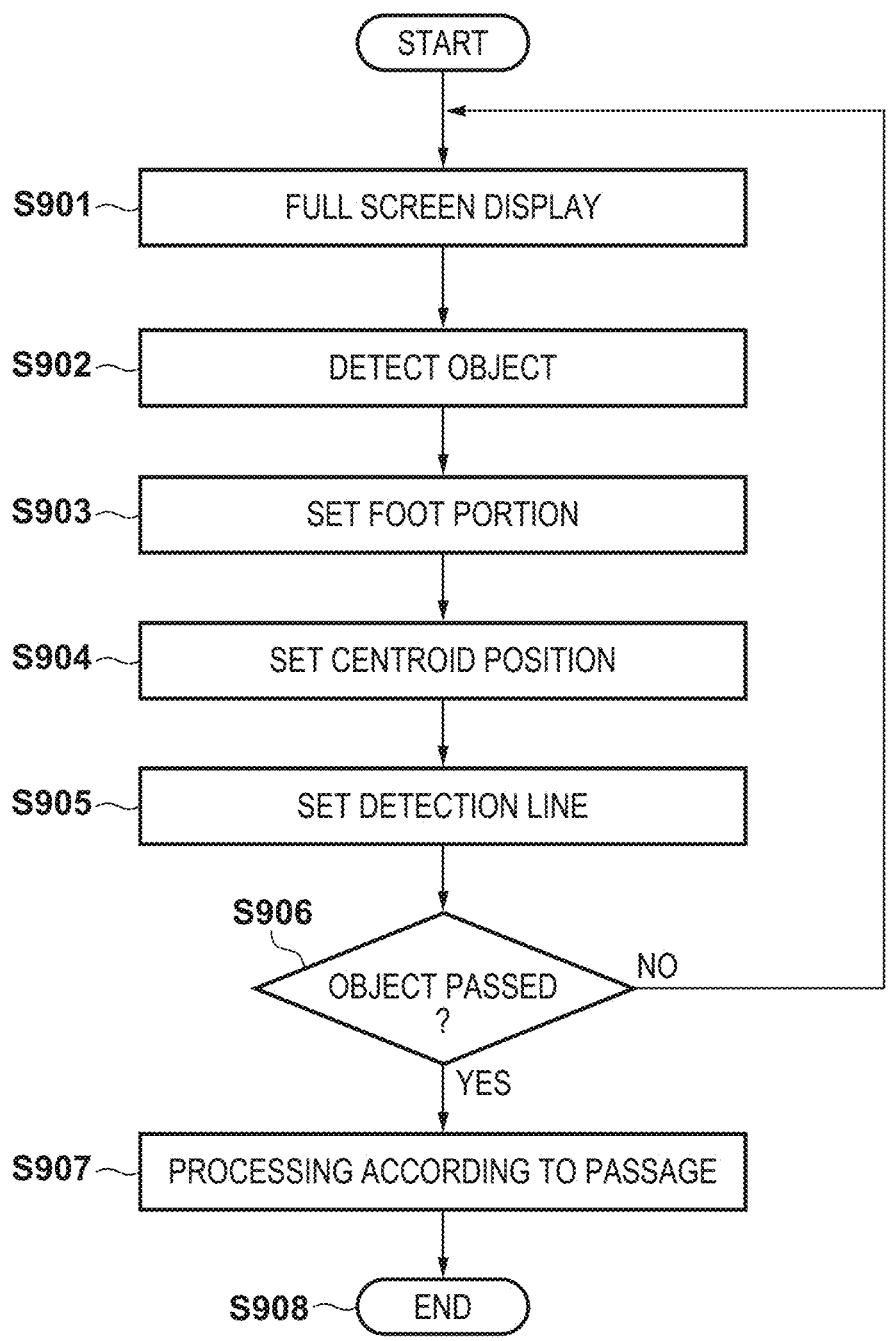
FIG. 9 is a flowchart showing the procedure of processing executed by an image capturing apparatus according to the second embodiment.

The procedure of processing executed by the image capturing apparatus 101 according to the second embodiment will be described next with reference to the flowchart of FIG. 9.

In step S901, a control unit 508 transmits the omnidirectional image 106 projected on an image sensor 502 via a fish-eye lens 501 to a display apparatus 105 to perform full screen display. In step S902, the control unit 508 controls a moving object detection unit 509 to detect a moving object in the omnidirectional image 106.

In step S903, the control unit 508 sets the foot portion of the detected moving object (object 104). As described with reference to FIGS. 7 and 8, the vertical position of the image capturing apparatus 101 (the central position of the omnidirectional image 106) is set as the vertical reference position 201, and the position of the object 104 nearest to the vertical reference position 201 is set as the position of the foot portion 802 of the object 104.

In step S904, the control unit 508 controls a setting unit 510 to set the centroid position 701 with respect to the foot portion 802 of the object 104. In step S905, the control unit 508 controls the detection line setting unit 1001 to set the detection line 801 corresponding to the centroid position 701.

In step S906, the control unit 508 controls a passage detection unit 511 to determine, based on the detection line 801 and the centroid position 701 of the object 104, whether the centroid position 701 of the object 104 has passed across the detection line 801. It is thus determined whether the object 104 has passed across the detection line 203. If the object 104 has passed across the detection line 203, the process advances to step S907. On the other hand, if the object 104 has not passed across the detection line 203, the process returns to step S901.

In step S907, the control unit 508 executes processing according to passage of the object 104 across the detection line 203. Details of the processing are the same as in the first embodiment, and a description thereof will be omitted. Each process shown in FIG. 9 thus ends.

As described above, in this embodiment, the vertical position of the omnidirectional camera is defined as the reference position, a foot portion is set based on the positional relationship between the reference position and the object position, and the centroid position of the object and a detection line corresponding to the centroid position are newly set. Passage detection is done based on passage of the centroid position of the object across the detection line. It is therefore possible to reduce detection errors and implement stable passage detection even in a case where an object passes near the passage detection line.

Note that this embodiment may be combined with the first embodiment. In addition to the presence/absence of passage of the foot portion position of the object across the detection line, the presence/absence of passage of the centroid position of the object across the second detection line may be determined. When both conditions are met, it may be determined that the object has passed.

An example will be described below in which an image capturing apparatus 1101 does not vertically face downward but is attached with an angle.

Figure 11:
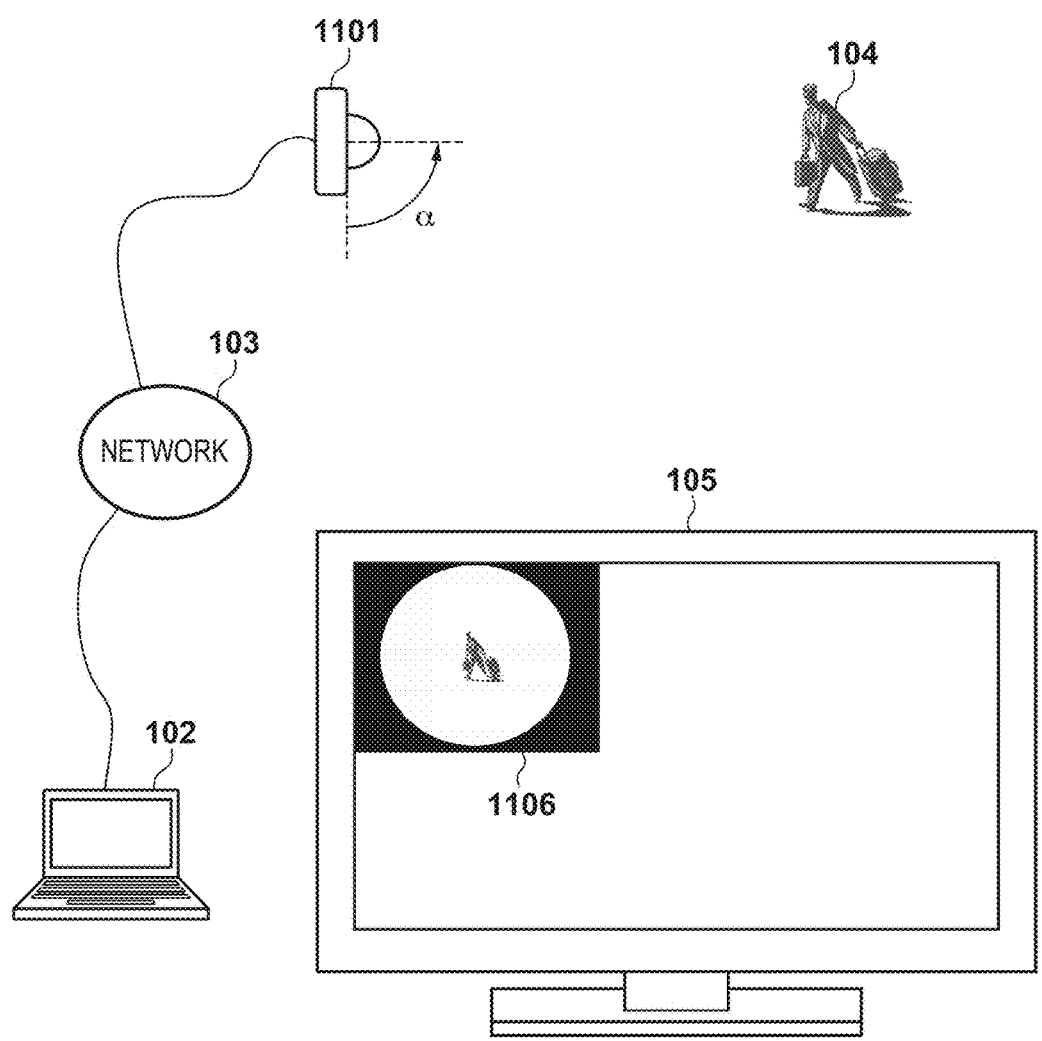
FIG. 11 is a view showing an example of the arrangement of a monitoring camera system according to the third embodiment.

FIG. 11 is a view showing an example of the arrangement of a monitoring camera system. Referring to FIG. 11, the image capturing apparatus 1101 is an omnidirectional camera including a fish-eye lens and is attached at a tilt angle α with respect to the vertical direction. The constituent elements of the image capturing apparatus are the same as in the first or second embodiment, and a description thereof will be omitted. A video of an object 104 captured by the image capturing apparatus 1101 is transmitted to a client terminal 102 or a recording server (not shown) via a network 103. A video 1106 displayed on a display apparatus 105 is a video (omnidirectional image) of the image capturing apparatus 1101.

A control unit 508 detects the tilt angle α of the image capturing apparatus 1101 with respect to the vertical direction, and sets a vertical reference position on the omnidirectional image 1106 according to the tilt angle α. This makes it possible to detect the foot portion of an object according to the tilt angle and improve the detection accuracy. For example, if the tilt angle is 90° with respect to the vertical direction, the lower portion of the round omnidirectional image 1106 is the vertical reference position.

According to the embodiment, it is possible to reduce detection errors and implement stable passage detection even in a case where an object passes near the passage detection line.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-227491, filed Nov. 7, 2014, which is hereby incorporated by reference wherein in its entirety.

What is claimed is:

1. An image capturing apparatus comprising:
one or more processors;
a memory having stored thereon instructions which, when executed by the one or more processors, cause the image capturing apparatus to:
detect an object moving on ground from a captured image captured by an image capturing unit via an omnidirectional imaging lens disposed so as to perform a capture in a direction perpendicular to a horizontal plane;
set reference position in the captured image corresponding to a position of the omnidirectional imaging lens provided vertically to ground, and to set a position of a foot portion of the object, in the captured image, based on a distance from the reference position;
decide, in the captured image, a centroid position of the object;
set a detection line by setting a height of the centroid position with respect to the position of the foot portion; and
detect passage of the centroid position of the object across a passage detection line on the ground, the passage detection line being based on the detection line set in advance according to an instruction of an operator.

2. The image capturing apparatus according to claim 1, wherein the instructions, when executed by the one or more processors, cause the image capturing apparatus to:
decide the position of the foot portion as the centroid position.

3. The image capturing apparatus according to claim 1, wherein the instructions, when executed by the one or more processors, cause the image capturing apparatus to:
set a second detection line by reflecting, on the detection line on the ground, the height of the centroid position with respect to the position of the foot portion; and
detect passage of the centroid position of the object across the second detection line.

4. The image capturing apparatus according to claim 3, wherein the instructions, when executed by the one or more processors, cause the image capturing apparatus to set, as the centroid position, a position apart from the position of the foot portion by a predetermined distance on a line that connects the reference position and the position of the foot portion.

5. The image capturing apparatus according to claim 4, wherein the instructions, when executed by the one or more processors, cause the image capturing apparatus to set the centroid position in accordance with a tilt angle of the omnidirectional imaging lens with respect to a vertical direction in real space.

6. A monitoring camera system comprising:
an image capturing apparatus comprising:
one or more processors;
a memory having stored thereon instructions which, when executed by the one or more processors, cause the image capturing apparatus to:
detect an object moving on ground from a captured image captured by an image capturing unit via an omnidirectional imaging lens disposed so as to perform a capture in a direction perpendicular to the horizontal plane;
set, reference position, in the captured image corresponding to a position of the omnidirectional imaging lens provided vertically to ground, and to set a position of a foot portion of the object, in the captured image, based on a distance from the reference position;
decide, in the captured image, a centroid position of the object;
set a detection line by setting a height of the centroid position with respect to the position of the foot portion; and
detect, passage of the centroid position of the object across a passage detection line on the ground, the passage detection line being based on the detection line set in advance according to an instruction of an operator, and
an information processing apparatus configured to obtain an image from the image capturing apparatus via a network.

7. A method of controlling an image capturing apparatus, comprising:
detecting an object moving on ground from a captured image captured by an image capturing unit via an omnidirectional imaging lens disposed so as to perform a capture in a direction perpendicular to the horizontal plane;
setting, reference position in the captured image corresponding to a position of the omnidirectional imaging lens provided vertically to ground, and to set a position of a foot portion of the object, in the captured image, based on a distance from the reference position;
deciding, in the captured image, a centroid position of the object;
setting a detection line by setting a height of the centroid position with respect to the position of the foot portion;
detecting, passage of the centroid position of the object across a passage detection line on the ground, the passage detection line being based on the detection line set in advance according to an instruction of an operator; and
detecting, in the captured image, passage of the centroid position of the object across a passage detection line which is set to a corresponding height with respect to ground as the centroid position of the object.

8. A non-transitory computer-readable storage medium storing a computer program for causing a computer to execute a method of controlling an image capturing apparatus, the method comprising:
detecting an object moving on ground from a captured image captured by an image capturing unit via an omnidirectional imaging lens disposed so as to perform a capture in a direction perpendicular to the horizontal plane;
setting, reference position, in the captured image corresponding to a position of the omnidirectional imaging lens provided vertically to ground, and to set a position of a foot portion of the object, in the captured image, based on a distance from the reference position;
deciding, in the captured image, a centroid position of the object, based on the position of the foot portion;
setting a detection line by setting a height of the centroid position with respect to the position of the foot portion;
detecting, passage of the centroid position of the object across a passage detection line on the ground, the passage detection line being based on the detection line set in advance according to an instruction of an operator; and
detecting, in the captured image, passage of the centroid position of the object across a passage detection line which is set to a corresponding height with respect to ground as the centroid position of the object.

* * * * *